United States Patent [19]

Camus

[11] Patent Number: 4,710,614

[45] Date of Patent: Dec. 1, 1987

[54] SECURITY DOCUMENT USING OPTICAL FIBERS AND AUTHENTICATION METHOD

[75] Inventor: Michel Camus, Charavines, France

[73] Assignee: Arjomari-Prioux, Paris, France

[21] Appl. No.: 875,622

[22] Filed: Jun. 18, 1986

[30] Foreign Application Priority Data

Jun. 24, 1985 [FR] France ............................... 85 09586

[51] Int. Cl.⁴ ............................................... G06K 5/00
[52] U.S. Cl. .................................... 235/380; 235/473; 235/487
[58] Field of Search ......................... 235/380, 473, 487

[56] References Cited

U.S. PATENT DOCUMENTS 4,138,057  2/1979  Atalla .................................. 235/380

Primary Examiner—Harold I. Pitts
Attorney, Agent, or Firm—Bacon & Thomas

[57] ABSTRACT

A security document comprising a substrate containing at least one optical fiber of which at least one end is flush with a surface of the substrate so as to permit authentication of the document by a test based on the exposure of the document to a source of electromagnetic radiation and simultaneous observation of the radiation transmitted to either end of the optical fiber. The optical fiber has a transparent coating and is located within the substrate at a depth from at least one surface of the substrate which is not greater than the depth of penetration of the electromagnetic radiation into the substrate. The radiation which penetrates the substrate to the optical fiber is trapped in the optical fiber and transmitted to at least one end at which it is observed to authenticate the document.

10 Claims, 2 Drawing Figures

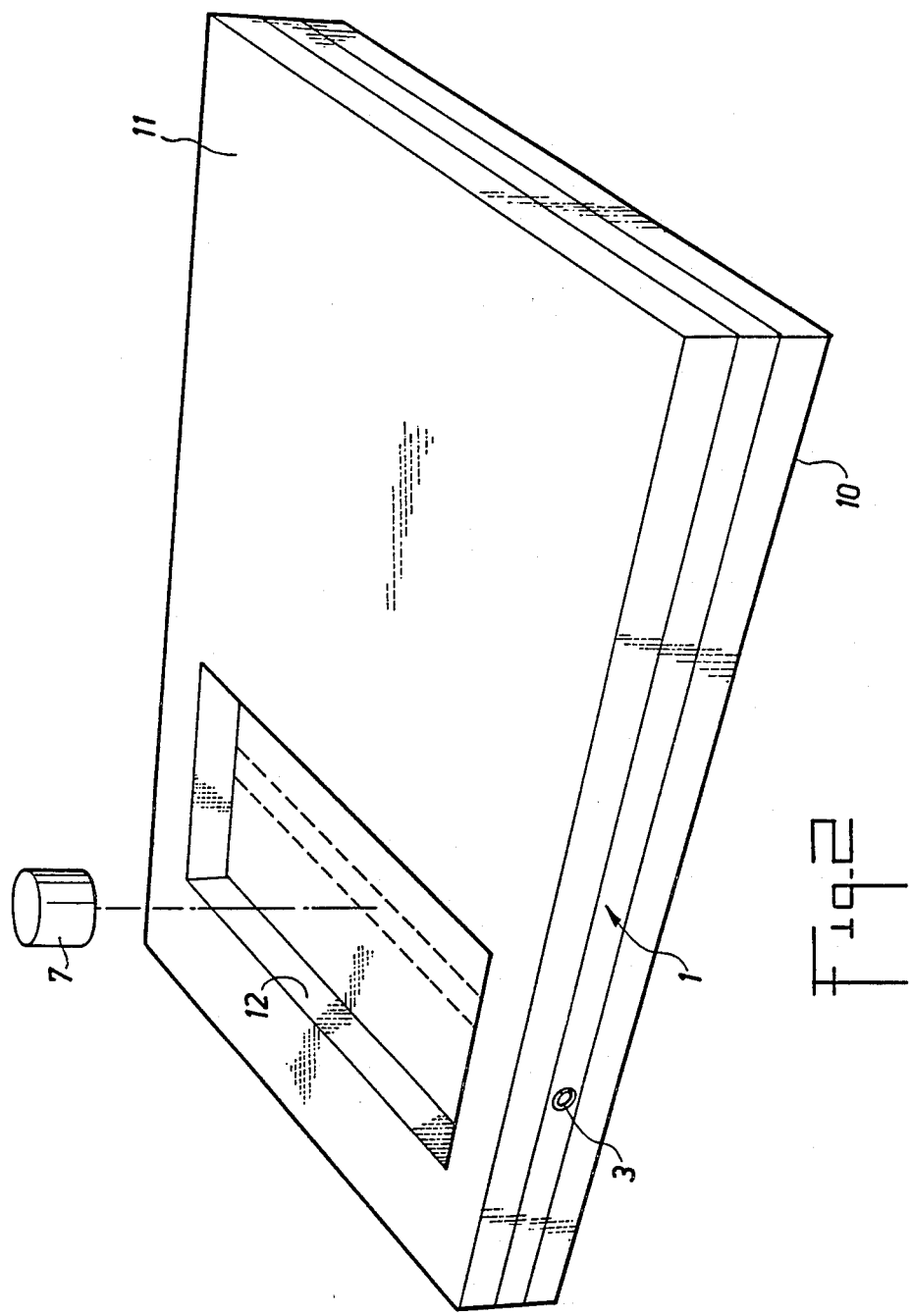

SECURITY DOCUMENT USING OPTICAL FIBERS AND AUTHENTICATION METHOD

BACKGROUND OF THE INVENTION

The invention relates to a security document containing a security means in which certain specific properties are detectable.

The equipment and techniques at the disposal of forgers are evolving and now enable them to copy quickly and more readily duplicate the authentication means and techniques, particularly in the case of banknotes currently used, thus compelling a constant search for new security devices.

As a precaution against counterfeit security documents such as banknotes, bonds, stocks, identification cards, checks and other valuable documents, it has been proposed to use various security means such as watermarks, colored and/or metallic or metallized fibers, absence of optical bleach, or security strips or wires, whether these are printed, metallized, fluorescent or magnetic. Such security means are known as "recognition means" as they permit authentication of such documents. (See for reference, GB-A-1 363 244, GB-A-440 421 and EP-A-66 854).

The development of new security means has therefore been directed toward highly technical products with, for example, security means which, by their very nature, complexity or other factors, will not normally be available to forgers before at least a few years, and which are readily identifiable by the general public without the need to use sophisticated equipment. In addition, these products can be authenticated by professional users such as banks by way of reliable and instantaneous automatic control means.

Utilization by the general public normally leads to the use of optical systems permitting visual identification under natural or artificial lighting, such as obtained with a WOOD lamp.

It is, for example, already known to use synthetic fibers containing luminescent substances based on rare earth metals in their mass or on their surface. (See for reference EP-A-66854 and FR-A-1 522 465.) However, such means can prove unreliable when they are destined for use by the general public, since they can be forged by printing with ink or varnish containing similar substances. (See for reference FR-A-1471367).

Other security documents, such as those in GB-A-2 148 486, GB-A-2099756, U.S. Pat. Nos. 4,138,057 and 3,728,521, comprise a base material incorporating at least one optical fiber, and generally an assembly of several optical fibers intended to form coded information. Authentication of the document is achieved by illuminating one end of the fibers and observing the light transmitted to the other end. Such a technique requires relatively complicated detection means in order to allow for adequate illumination and observation of the ends of the optical fibers. Moreover, these documents are fragile, and any incidental or unintentional breakage of one fiber will prevent transmission of light and thus distort the observed message.

SUMMARY OF THE INVENTION

It is the object of the present invention to provide a new security means, using optical fibers, without any of the aforesaid disadvantages. This object is obtained according to the invention due to the fact that the optical fibers have a transparent coating, and the thickness of the substrate covering the optical fibers is less than the depth of penetration into the substrate of at least one electromagnetic radiation to be trapped in the optical fibers. In other words, the optical fiber has a transparent coating and is located within the substrate at a depth from at least one surface of the substrate which is not greater than the depth of penetration of the electromagnetic radiation into the substrate. The radiation which penetrates the substrate to the optical fiber is trapped in the optical fiber and transmitted to at least one end at which it is observed to authenticate the document.

Thus, according to the invention, the authentication method consists of exposing the document to a source of electromagnetic radiation which penetrates the substrate to reach the surface of the optical fibers, and is trapped in the optical fibers and transmitted to an end of the optical fibers, and simultaneously observing the radiation transmitted to either of the ends of the optical fibers for authentication. When the substrate containing the optical fibers is made by paper making techniques, one end of the optical fiber is flush with an edge of the substrate, and one surface of the substrate is exposed to the radiation and the edge is observed to detect the authenticating radiation.

One advantage of the invention resides in the large surface of optical fiber which is exposed to the radiation. Another advantage resides in that if a fiber breaks in two, each piece of the fiber will continue to transmit that part of the radiation received on its surface toward the end which is flush with the edge of the substrate. A break in the optical fiber does not destroy the security feature of the security document. Yet another advantage of the invention is the availability of various optical properties which can be obtained by doping the fibers, in order to provide a code on the substrate.

Optical fibers are known to channel electromagnetic waves of different wavelengths, in particular light waves, toward at least one of their ends, due to the different index of refraction of each of the materials which constitute the core and the coating (i.e., sheath or cladding) of the fibers. The security means according to the invention is based on the transmission of electromagnetic radiation, such as light rays and ultraviolet or infrared waves, toward at least one end of the optical fibers. These waves travel through the substrate and are intercepted through the transparent surface of the fibers and are trapped therein due to the different refractive indexes of the fiber components. The waves are transmitted through the length of the fibers and are observed at the ends of the fibers. It is possible to use non-doped, colorless fibers which transmit all of the intercepted wavelengths.

Preferably, however, a specific wavelength may be transmitted by each fiber by doping the fiber core with adapted luminophore substances. The transmitted radiation can be one within the visible, ultraviolet or infrared spectra in order to permit, in particular, a displayable coding of the security documents. Such coding may be achieved with one specific optical fiber or with a combination of several optical fibers, or else in combination with other known security means such as luminescent wires. In order to obtain a coding by the combination of several optical fibers, a security strip may be produced by placing the optical fibers side by side and then bonding them together to facilitate their subsequent insertion into and positioning within the document.

The optical fibers necessary to carry out the invention are selected as a function of their performance over time (which is important for the efficiency of the security system), and of their mechanical strength under the stresses to which they will be subjected during the life of the document, such as folding and creasing in the case of banknotes, even though the document according to the invention can continue to function quite satisfactorily after suffering breakage of fibers. Consequently, mineral optical fibers based on silica and glass are generally considered unsuitable for all non-rigid substrates, because of their brittleness and their cost. Plastic fiber materials, in particular organic fibers, which are very supple and are less expensive will be preferably used. The transmission quality of such fibers has now been found to be quite satisfactory.

The preferred optical fibers according to the invention are those described in French patents Nos. FR-A-2533709 and FR-A-2545616. These patents correspond to U.S. Pat. Nos. 4,552,431 and 4,571,313, respectively, and the entire disclosure of each is herein incorporated by reference. The fluorescent optical fibers of which the core is doped with fluorescent products which absorb certain wavelengths in order to retransmit radiation of different wavelengths which are channelled in said fibers are preferred. The fibers described in these patents also have at their end a solid angle of transmission or reception of radiation which is wide enough to ensure transmission of the light flux (in case of accidental breakage of the fiber inside the substrate) without any great loss of intensity between the two sections created by the breakage.

Available optical fibers are monocore or multicore (see FR-A-2 545 616 and U.S. Pat. No. 4,571,313 for reference) and are introduced in the substrate to be made secure, by the techniques conventionally used by one of ordinary skill in the art for introducing wires and strips in security documents. The fibers can be introduced individually, or, for example, via carrier elements such as security wires and strips, to which they are bonded. By way of example, a security paper according to the invention can be obtained by unwinding the optical fiber during the formation of the web on the cylinder mold or flat table of a papermaking machine, or by inserting the fiber between two moist plies of paper for those machines equipped with more than one cylinder mold and/or flat table. The papermaking processes usable for forming the paper web are described, for example, in the work by J. P. Casey, entitled "Pulp and Paper, Chemistry and Chemical Technology" (3rd Edition, 1980, vol. 2, Ed. Wiley Interscience Publication–John Wiley & Sons–New York Chichester). See also British Pat. No. 1486079.

Since the object is to trap the light received by the surface of the fiber, the transparency of the substrate to the light flux must be sufficient for the light to reach the surface of the optical fiber, at least in certain areas of the substrate and of the fiber. In other words, the thickness of the substrate covering the optical fiber must be less than the depth at which the radiation to be intercepted in the optical fiber penetrates into the material constituting the substrate. With highly opaque materials and using a papermaking technique, the wire of the papermaking machine will necessarily be placed close to one of the surfaces of the substrate, particularly in cases with paper of high base weight so that the optical fibers will be sufficiently close to the surface of the paper substrate to allow penetration of the radiation to the fiber. The assymmetry thus created by having the optical fibers closer to one surface can be used as a secondary means of recognition of each of the faces of the substrate or as an additional coding element.

The four following examples are given to illustrate the invention.

EXAMPLE 1

An optical fiber "PLASTIFO F 201" of 20$\mu$m (microns) diameter is introduced between two moist paper base plies of 40 g/m$^2$ each in order to form, after pressing and drying in the multijet papermaking conditions, a security document of 80 g/m$^2$ which presents, on its edge, by specific exposure to radiation at 400 nm on its surface, a green luminous point due to the transmitted light ray of wavelength 500 nm through the optical fiber. The green light point is visible to the naked eye due simply to the exposure of the document to daylight.

EXAMPLE 2

A security document is produced according to the procedure of Example 1 using a "PLASTIFO F 200" optical fiber. However, the excitation is obtained by means of a WOOD lamp in the U.V. spectrum at around 360 nm, and the transmission is visible in the blue spectrum at around 420 nm.

EXAMPLE 3

The two fibers of Examples 1 and 2 are used in combination in the same substrate using the method of Example 1 to obtain a simple coding in the security document.

EXAMPLE 4

An optical fiber of the same type as "PLASTIFO F 201" was produced in such a way as to obtain a flat optical fiber of which the thickness and width are 35 $\mu$m and 0.75 $\mu$m, respectively. This optical fiber gives the same response as the "PLASTIFO F 201" of Example 1 under exposure to radiation at 400 nm.

However, the flat shape of the optical fiber, which is nearer that of the security strips already used in the papermaking industry to make security documents, presents, over the round optical fibers, the following advantages: (1) improved ease of production of the document; (2) exposure of a larger surface to the source of excitation for an equal length and width (as compared to the round fiber); and (3) improved detection of the light phenomenon on the end of the optical fiber which is flush with the substrate due to the much greater section of the flat fiber, compared with a round optical fiber of similar thickness.

"PLASTIFO F 200" and "PLASTIFO F 201" are the trademarks of fibers produced by the company OPTECTRON under CEA (Commissariat a l'Energie Atomique) license of French patents Nos. 2533709 and 2545616 which correspond to U.S. Pat. Nos. 4,552,431 and 4,571,313. These fibers have a core of styrene doped with fluorescent substances and a coating of styrene copolymer and methyl methacrylate. The fibers of small diameter which are used in the examples are obtained by drawing the commercial fibers.

Authentication of the document according to the invention is possible by way of non-destructing test. For example, visual authentication by the general public is possible when transparent coated fibers are used, by observing with the naked eye one of the edges of the document after illuminating its surface. Transparent coated fibers retransmit the visible spectrum. In fact, it is sufficient to illuminate the whole document naturally, since the light point on the edge is set off by contrast to the naked eye.

For professional enterprises, an automatic detection system can be used, which system may comprise, for example, a source of poly- or mono-chromatic light which illuminates the entire surface of the document. This light source is associated to one or more detectors of monochromatic wavelengths specific to the transmitting wavelengths of the doping agents of each optical fiber, which detectors are used and directed toward one end of each of said fibers.

The invention is in no way limited to the foregoing examples or to the security documents described hereinabove. On the contrary, the invention can be extended to: (1) The production of credit cards by plasticizing a paper containing the optical fiber or by introducing the optical fiber into the mass of the card using means conventionally employed by card manufacturers; and (2) The production of packages and labels to enable manufacturers, particularly in the luxury industries, to detect infringers or distributors who are not fulfilling their contracts.

BRIEF DESCRIPTION OF THE DRAWINGS

The invention will be more readily understood on reading the following description with reference to the accompanying drawings.

FIG. 2 is a diagrammatical illustration of a second authentication device.

DESCRIPTION OF THE PREFERRED EMBODIMENTS

Figure 1:
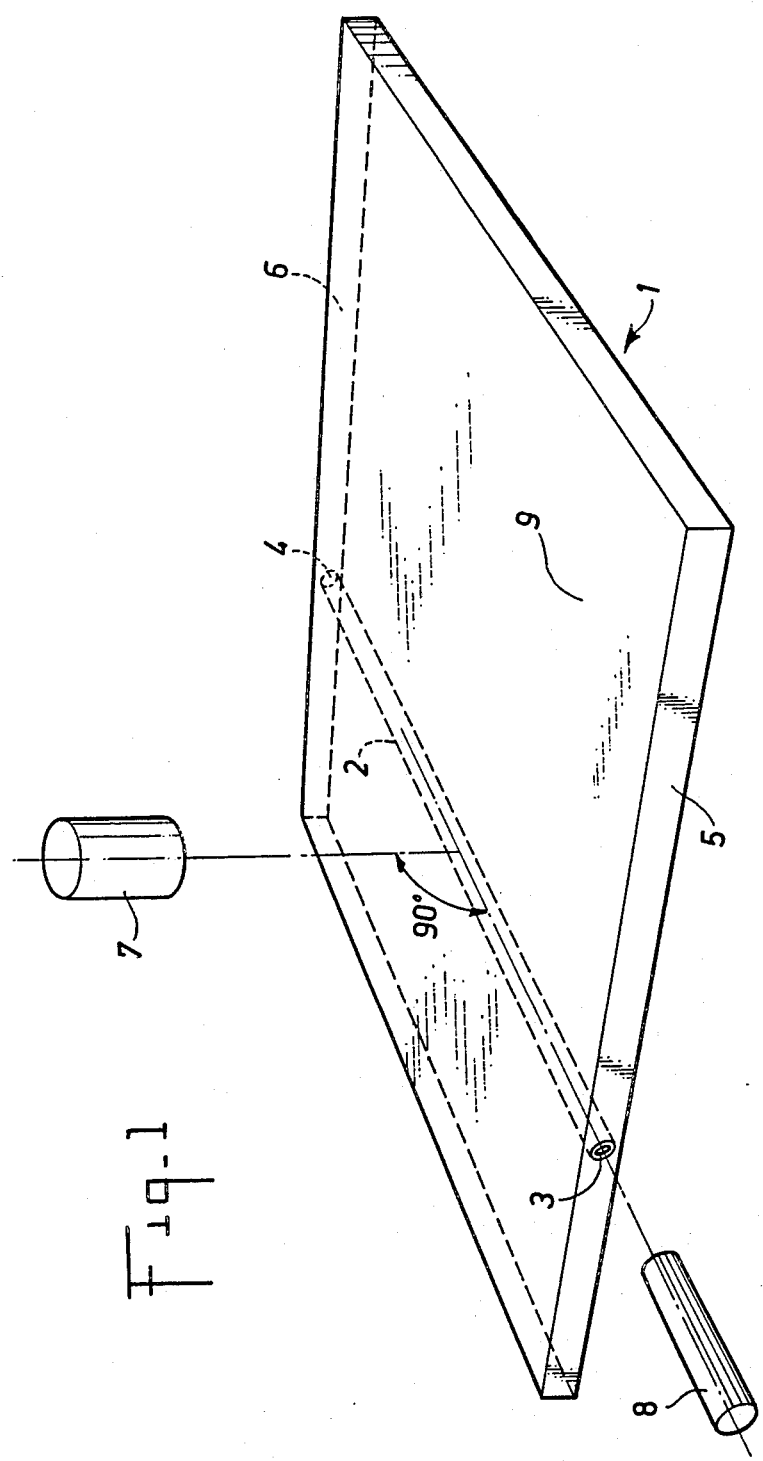
FIG. 1 is a diagrammatical illustration of a first authentication device.

FIG. 1 diagrammatically shows one example of a security document according to the invention including the authentication method. The security document (substrate) 1 is provided on the inside with an optical fiber 2 which transverses the document. Ends 3 and 4 of the optical fiber are level with the edges 5 and 6 of the substrate 1. A source of radiation 7, which may optionally be the sun, perpendicular to the main face 9 of the substrate 1 sends electromagnetic radiation through the portion of the substrate above the optical fiber 2. This radiation arrives at the transparent surface of the fiber 2, which fiber traps and transmits to its ends 3 and 4 radiation which can be observed, for example, by the detector 8 placed in alignment with the fiber, or directly by the human eye.

In FIG. 2, the substrate 1 passes through a device composed of plates 10 and 11 of a material impervious to the radiation transmitted by source 7. Only a window 12, provided in plate 11, enables the radiation to reach a controlled part of the substrate face, and hence, of the fiber face. Window 12 may be a simple recess in plate 11 or a recess filled with a material transparent to the excitation radiation. The method of authentication shown in FIG. 2 has the advantage of reinforcing the reliability of the authentication by involving the accurate location of the fiber within the substrate.

Another possible alternative is a security document in which the plates 10 and 11 are each integrated to document 9 to constitute, for example, the sandwich of a credit card.

For the sake of simplicity, the drawings diagrammatically show an unidirectional beam impinging at a right angle on the fiber, in such a way that one would think that the incident radiation would not be refracted and therefore not trapped within the optical fiber. Indeed, it should be appreciated that normally used radiation is not unidirectional; even if it were so, the authentication device could be arranged such that the beams impinge on the fiber at an angle permitting refraction. Lastly, it should be taken into account that the substrate (or even the optical fiber itself) can contain a material promoting the diffraction of incident radiation. For example, cellulose which is used in papermaking substrates. The drawings also show only one fiber, but any number of fibers may be included in the security document. Also, the depth of the fiber from the surface of the substrate does not necessarily have to be the same for the entire length of the fiber. Various substrates containing optical fibers in accordance with the present invention could be combined to form a security document with optical fibers at different levels. Many other possibilities would be apparent to one of ordinary skill in the art.

What is claimed is:

1. A security document comprising a substrate containing at least one optical fiber of which at least one end is flush with a surface of the substrate so as to permit authentication of the document by exposing the document to a source of electromagnetic radiation and simultaneously observing the radiation transmitted to either end of the optical fiber and wherein the optical fiber has a transparent coating and is located within the substrate at a depth from at least one surface of the substrate which is not greater than the depth of penetration of the electromagnetic radiation into the substrate.

2. The security document as claimed in claim 1 wherein said optical fiber is an organic fiber.

3. The security document as claimed in claim 2, wherein the core of the optical fiber is based on polystyrene.

4. The security document as claimed in claim 2, wherein the transparent coating of the optical fiber is based on a styrene copolymer and methyl methacrylate.

5. The security document as claimed in claim 1 wherein said optical fiber is fluorescent.

6. The security document as claim in claim 1, wherein said optical fiber is flat.

7. The security document as claimed in claim 1, wherein said substrate is a paper base substrate.

8. The security document as claimed in claim 7, wherein the surface even with the end of the optical fiber is one edge of the substrate.

9. A method for authenticating a security document as claimed in claim 1, which comprises exposing the document to a source of electromagnetic radiation so as to reach the surface of the optical fiber and simultaneously observing the radiation transmitted to either end of said optical fiber.

10. The method as claimed in claim 9 for authenticating a security document comprising a paper base substrate containing at least one optical fiber of which at least one end is flush with a surface of the substrate so as to permit authentication of the document by exposing the document to a source of electromagnetic radiation and silultaneously observing the radiation transmitted to either end of the optical fiber and wherein the optical fiber has a transparent coating and is located within the substrate at a depth from at least one surface of the substrate which is not greater than the depth of penetration of the electromagnetic radiation into the substrate and wherein the surface even with the end of the optical fiber is one edge of the substrate, and wherein one face of the paper base substrate is exposed and one edge of said substrate is observed.

* * * * *

UNITED STATES PATENT AND TRADEMARK OFFICE
CERTIFICATE OF CORRECTION

PATENT NO. : 4,710,614

DATED : Dec. 1, 1987

INVENTOR(S) : CAMUS

It is certified that error appears in the above-identified patent and that said Letters Patent is hereby corrected as shown below:

Column 1, line 24, "GB-A-1363244" should read --GB-A-1353244--.

Column 3, line 27, "angle of transmission" should read --angle of emission--.

Column 4, line 37, "0.75µm" should read --0.75mm--.

Signed and Sealed this

Ninth Day of August, 1988

Attest:

DONALD J. QUIGG

Attesting Officer *Commissioner of Patents and Trademarks*